UNITED STATES PATENT OFFICE.

BYRON B. GOLDSMITH, OF NEW YORK, N. Y.

THERMOPLASTIC COMPOUND OF BLOOD OR EGG PROTEID.

No. 923,353.  Specification of Letters Patent.  Patented June 1, 1909.

Application filed October 7, 1907. Serial No. 396,193.

*To all whom it may concern:*

Be it known that I, BYRON B. GOLDSMITH, a citizen of the United States, residing in the borough of Manhattan, city, county, and State of New York, have invented a certain new and useful Improvement in Thermoplastic Compound of Blood or Egg Proteid, of which the following is a specification.

This invention has relation to an improved thermoplastic compound formed by treatment of the proteids of blood and of eggs and their derivatives and compounds.

In my U. S. Patent Number 840,931, dated January 8th, 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while reasonably hard at ordinary temperatures, are rendered soft by heat, so as to permit the uniting of separate masses, and the molding of any mass to any desired shape. My present invention is based upon the discovery that the results obtained by the method described in said patent as applied to casein can also be reached by a similar treatment of the proteids of eggs and of blood with their derivatives and compounds. Albumen is found in large proportions in both eggs and blood and in the latter the proteid known as fibrin is found in large proportions and the expression "egg and blood proteids" is to be understood herein as covering, not only the specific substances above named, but also the associated albuminoids found in eggs and blood.

Shortly stated my invention involves the modification of the properties of these proteid bodies by uniting them with converting agents under conditions of heat and pressure, for the production of a thermoplastic composition of matter, useful in the manufacture of molded articles of many kinds, and supplying a cheap and superior substitute for celluloid, rubber etc.

The term "converting agent" as used in my present specification and claims covers any substance which, when combined or admixed with an egg or blood proteid or proteids, their derivatives or compounds, acts, when heated to soften the same, but whose softening action is suspended or materially diminished upon lowering the temperature of the mass.

Among the converting agents which I have found useful are alpha-naphthol, beta-naphthol, benzoic acid, carbolic acid, hydrochinon, kresol, pyrocatechin, resorcin, salicylic acid, urea, benzoic acid, phthalic acid, phloroglucin, pyrogallol, paratoluidin, naphthylamin, benzidin, oxy-naphthoic acid, anilin, toluidin and xylidin. It is to be understood however that I do not limit myself to these, but that my invention covers the use of equivalents of these substances and has the scope heretofore explained. The mode of action of these converting agents is not altogether clear. In some cases it is probably due to partial solution of the proteid when heated, but I do not confine myself to any theory of action; nor is it essential to my invention whether or not there is a chemical combination between the proteid and the converting agent.

One characteristic of a "converting agent" is its capacity to remain in the mass and not be volatilized to a material extent when moderate heat is applied. I have discovered that the best results are obtained by the use of solid reagents, such as alpha or beta-naphthol and I have claimed this variant of my process and product specifically herein. Where flexibility is desired in the product, however, I have discovered that a liquid converting agent or liquids not antagonistic to the mixture may be combined with a solid agent to great advantage.

The properties of the thermoplastic compound in the cold state will vary with the particular converting agent employed and with the proportions used. Thus a great variety of characteristics are obtainable by suitable variations in proportions and qualities.

In the manufacture of my present composition the egg or blood proteids or their derivatives undergo the same treatment as is described in my aforesaid patent in connection with casein; that is to say, they may be united with the converting agent on or between suitably heated rolls. Any other method may be used whereby these substances are brought into intimate contact. Instead of using the converting agents in their natural state, they may be first dissolved in alcohol, water, or other suitable liquid which is afterward driven off by heat.

One of the practicable proportions which I have used is the following: Take a quantity of egg albumen or of coagulated blood, which would weigh four pounds if dried and sprinkle the same with one pound of beta-naphthol dissolved in alcohol. This is then well mixed preferably on suitably heated rolls, and when the mixture is completed, the mass is removed and is soft while hot but hardens on cooling.

If instead of albumen a compound thereof with tannin be employed as above described, a satisfactory result is obtained, and it is to be understood that such a compound, as well as many others, are equivalents of albumen in this connection.

Instead of using one or more of the proteids named isolated by chemical means I may use the blood or egg itself, suitably prepared for mixture with the converting agent.

Certain converting agents are better adapted to be used with some derivatives or compounds of egg or blood proteids than with others; or combinations of two or more derivatives or compounds may give results superior to those obtained from use of a single proteid or derivative.

Scraps of substances of various nature may be mixed in with the masses formed by my process, in considerable quantities. Among these are celluloid scraps, finely divided albuminoids, bits of horn, rubber, resins, gums and coloring matter. Compounding substances or fillers can also be incorporated without departing from my invention.

I have found that, in order to produce the best results, the converting agent or agents employed should be "non-hygroscopic", by which I mean that they should not have the property of extracting moisture from the atmosphere. For this reason I have made specific claims for the use of non-hygroscopic converting agents. All of the agents which I have named above belong to this class.

What I claim is—

1. The process of producing a thermoplastic compound which consists in intimately mixing a converting agent with one or more of the egg or blood proteids, substantially as described.

2. The process of making a thermoplastic composition of matter which consists in intimately mixing a converting agent with one or more of the egg or blood proteids and then heating and pressing the combined ingredients, substantially as described.

3. The process of producing thermoplastic composition of matter which consists in intimately mixing beta-naphthol with one or more of the egg or blood proteids and then subjecting the combined ingredients to simultaneous heat and pressure, substantially as described.

4. The process of producing a thermoplastic composition of matter which consists in intimately mixing beta-naphthol with one or more of the egg or blood proteids, substantially as described.

5. The process of making a composition of matter which consists in uniting one or more of the proteids of blood or egg with an agent or agents which render the same thermoplastic, substantially as described.

6. The process of making a thermoplastic composition of matter which consists in intimately mixing one or more of the egg or blood proteids with a normally solid converting agent, substantially as described.

7. The process of making a thermoplastic composition of matter which consists in uniting one or more of the proteids of blood or egg with a normally solid converting agent and subjecting the mass to heat and pressure, substantially as described.

8. The process of making a relatively pliable thermoplastic composition of matter which consists in uniting one or more of the proteids of blood or egg with a normally solid converting agent and a normally liquid converting agent, and subjecting the mass to heat and pressure, substantially as described.

9. The process of making a relatively pliable thermoplastic composition of matter which consists in intimately mixing one or more of the egg or blood proteids with a normally solid converting agent and a liquid not antagonistic to the mixture, substantially as described.

10. A composition of matter consisting of a thermoplastic blood or egg proteid, substantially as described.

11. A composition of matter consisting of blood or egg proteid or its equivalent united with beta-naphthol, substantially as described.

12. A composition of matter consisting of blood or egg proteid and a converting agent, substantially as described.

13. A composition of matter consisting of blood or egg proteid and a normally solid converting agent, substantially as described.

14. A composition of matter consisting of blood or egg proteid, a normally solid converting agent and a normally liquid converting agent, substantially as described.

15. A composition of matter consisting of blood or egg proteid and a non-hygroscopic converting agent, substantially as described.

BYRON B. GOLDSMITH.

Witnesses:
H. S. MacKaye,
M. A. Butler.